(12) United States Patent
Bernier et al.

(10) Patent No.: US 11,411,930 B1
(45) Date of Patent: Aug. 9, 2022

(54) COMMUNICATIONS RELAYS

(71) Applicant: Realified, Inc., Los Angeles, CA (US)

(72) Inventors: Daniel Bernier, Los Angeles, CA (US);
Stephen Hewitt, Portland, OR (US);
Shaun Davidson, Portland, OR (US);
Craig Bartholomaus, Portland, OR (US)

(73) Assignee: Realified, Inc., Los Angeles, CA (US)

( * ) Notice: Subject to any disclaimer, the term of this patent is extended or adjusted under 35 U.S.C. 154(b) by 0 days.

(21) Appl. No.: 17/500,061

(22) Filed: Oct. 13, 2021

(51) Int. Cl.
*H04L 9/40* (2022.01)
*H04W 12/02* (2009.01)
*H04B 7/155* (2006.01)

(52) U.S. Cl.
CPC ......... *H04L 63/0421* (2013.01); *H04B 7/155* (2013.01); *H04L 63/0428* (2013.01); *H04W 12/02* (2013.01)

(58) Field of Classification Search
CPC . H04L 63/0421; H04L 63/0428; H04B 7/155; H04W 12/02
See application file for complete search history.

(56) References Cited

U.S. PATENT DOCUMENTS

| | | | |
|---|---|---|---|
| 8,428,228 B1 | 4/2013 | Baxter, Jr. | |
| 8,701,046 B2 | 4/2014 | McCann et al. | |
| 8,805,714 B2 | 8/2014 | Parikh et al. | |
| 8,861,537 B1 | 10/2014 | Braithwaite et al. | |
| 8,930,477 B2 | 1/2015 | May et al. | |
| 9,374,690 B2 | 6/2016 | Talwar et al. | |
| 9,686,061 B2 | 6/2017 | Ma et al. | |
| 9,967,242 B2* | 5/2018 | Parthasarathy | H04L 63/145 |
| 10,425,365 B2* | 9/2019 | Lee | H04L 51/066 |
| 10,805,257 B2 | 10/2020 | Yao et al. | |
| 2006/0176887 A1* | 8/2006 | Fair | H04L 67/125 370/469 |
| 2011/0053565 A1 | 3/2011 | Johansson et al. | |

FOREIGN PATENT DOCUMENTS

| | | |
|---|---|---|
| CA | 2606911 C | 10/2015 |
| WO | 2009127137 A1 | 10/2009 |

* cited by examiner

*Primary Examiner* — Duc C Ho
(74) *Attorney, Agent, or Firm* — Miller IP Law LLC

(57) ABSTRACT

Described herein are examples of communications relays. Systems, methods, and storage media may: receive, at a processing device of a communications server including a networking device configured to enable electronic communication by the processing device with a user device and a third party device via a communications service, an inbound communication from the third party device; determine, using the processing device, a sender identity associated with the inbound communication; create, using the processing device, an inbound communication digest of the inbound communication; store, using the processing device, the sender identity and the inbound communication digest on an electronic data storage unit; recast, using the processing device, the inbound communication to a relayed inbound communication including the inbound communication and the sender identity; and send, using the processing device, the relayed inbound communication to the user device.

20 Claims, 17 Drawing Sheets

COMMUNICATIONS RELAYS

BACKGROUND

Tenants and prospective tenants may seek to communicate with a landlord or property manager of a rental property. Landlords often depend on an ability to receive telephone calls, short message system (SMS) messages, multimedia messaging service (MMS) messages, or emails from tenants or prospective tenants. Such communications may be related to questions or issues regarding a present lease or may be related to an inquiry regarding a prospective new lease.

BRIEF DESCRIPTION OF THE DRAWINGS

The present description will be understood more fully when viewed in conjunction with the accompanying drawings of various examples of communications relays. The description is not meant to limit the communications relays to the specific examples. Rather, the specific examples depicted and described are provided for explanation and understanding of communications relays. Throughout the description the drawings may be referred to as drawings, figures, and/or FIGs.

DETAILED DESCRIPTION

Figure 1:
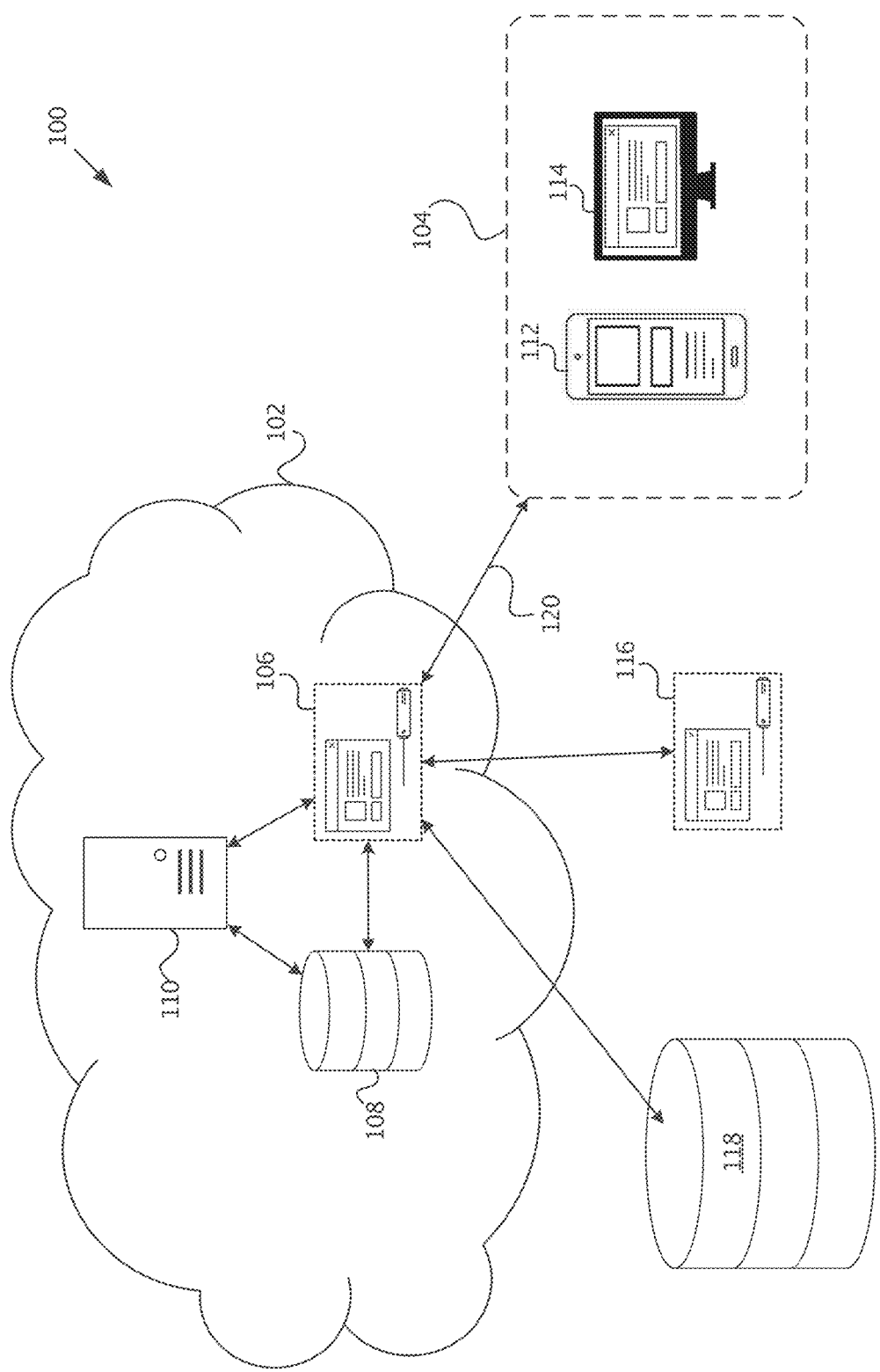
FIG. 1 illustrates a communications relay system, according to an embodiment.

A communication relay as disclosed herein will become better understood through a review of the following detailed description in conjunction with the figures. The detailed description and figures provide merely examples of the various embodiments of communications relays. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional communications systems and arrangements present significant difficulty, inconvenience, and privacy concerns for landlords and tenants. A common way for landlords to communicate contact information such as, for example, telephone numbers and/or email addresses to potential tenants who may make an inquiry is to include it on a sign at or near the rental property or on literature about the rental property (e.g., pamphlets, websites, etc.). Landlords may publicize their personal telephone number (e.g., their landline telephone number or their cellular telephone number) and/or email address to receive inbound inquiries from prospective tenants. Such inbound inquiries and other communications to or from tenants may be by, for example, telephone calls, simple message syndicate (SMS) messages, multimedia messaging service (MMS) messages, or emails. Some landlords may utilize a separate communications channel (e.g., telephone line(s), email service(s)) for publicity for tenant and prospective tenant communications.

Landlords using their personal communications channels may be limited in that cost may prohibit maintaining a separate communications channel. For those landlords who can afford to utilize separate communications channels, logistical difficulties may present in having to maintain separate communications channels for all of, groups of, or each of their rental properties.

Both use of personal communications and separate communications present issues related to tracking, privacy, separateness, and property distinction. Tracking which messages or calls were from which tenants or prospective tenants and for which property may be cumbersome. Various inbound tenant and prospective communications amalgamated with a landlord's personal communications may present difficulties in maintaining a separation between the landlord's business and personal life. Privacy concerns may arise for both tenants or prospective tenants and landlords when communications are amalgamated with the landlord's personal communications on the landlord's personal device, which may be accessible by another. Further, a landlord may be unable to utilize distinct communications channels or contact information for distinct properties or groups of properties, for example, a landlord may wish to utilize one telephone number for one property and another telephone number for another property but be unable to due to logistical difficulties (e.g., the landlord may not be able to maintain multiple telephone handsets at any given time) or unaffordability. A lack of separation between personal and business communications channels or between distinct property communication channels may hinder efficient or effective business and may provide for opportunity for erroneous communications.

Conventional communications systems may include systems for assisting in aggregating communication channels by aggregating inbound communications for display and recording. However, such systems may require use of specialized hardware or systems, which may require internet access. Such systems may further present what could be an overwhelming amount of information from varying sources, still requiring the landlord to manage each one individually.

Implementations of communications relays may address some or all of the problems described above. A communications relay may include a method, system, or non-transient computer-readable storage media having instructions embodied thereon, the instructions being executable by one or more processors to perform a method for relaying a communication.

Communications relays may aggregate communications from landlords such that various tenants and prospective tenants can communicate with a landlord via various communications channels, while from the landlord's perspective, the landlord may interact with various tenants or prospective tenants via the same communication channel. The communications relay system may, for example, aggregate various email, short message system (SMS), or telephone channels into a single channel for the landlord to manage and utilize for communications.

Communications relays may involve establishing a persona for each third party (e.g., tenants or prospective tenants), and provide for aggregate communications through each communications channel with each third party. Embodiments may enable a user to receive communications from various communications channels from third parties through the user's designated communications channel, thus obviating problems associated with amalgamating various communications channels in an interface and addressing logistical difficulties that would otherwise persist related to maintaining various communications channels (e.g., multiple cellular phones or email accounts).

FIG. 1 illustrates a communications relay system 100, according to an embodiment. The communications relay system 100 includes internal and external data resources for managing a project. The communications relay system 100 may result in reduced memory allocation at client devices and may conserve memory resources for application servers.

The communications relay system 100 may include a cloud-based data management system 102 and a user device 104. The cloud-based data management system 102 may include an application server 106, a database 108, and a data server 110. The user device 104 may include one or more devices associated with user profiles of the communications relay system 100, such as a smartphone 112 and/or a personal computer 114. The user device 104 may have a graphical user interface, which may provide for displaying information on a screen of the user device 104. The communications relay system 100 may include external resources such as an external application server 116 and/or an external database 118. The various elements of the communications relay system 100 may communicate via various communication links 120. An external resource may generally be considered a data resource owned and/or operated by an entity other than an entity that utilizes the cloud-based data management system 102 and/or the user device 104.

The communications relay system 100 may be web-based. The user device 104 may access the cloud-based data management system 102 via an online portal set up and/or managed by the application server 106. The communications relay system 100 may be implemented using a public Internet. The communications relay system 100 may be implemented using a private intranet. Elements of the communications relay system 100, such as the database 108 and/or the data server 110, may be physically housed at a location remote from an entity that owns and/or operates the communications relay system 100. For example, various elements of the communications relay system 100 may be physically housed at a public service provider such as a web services provider. Elements of the communications relay system 100 may be physically housed at a private location, such as at a location occupied by the entity that owns and/or operates the communications relay system 100.

The communication links 120 may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
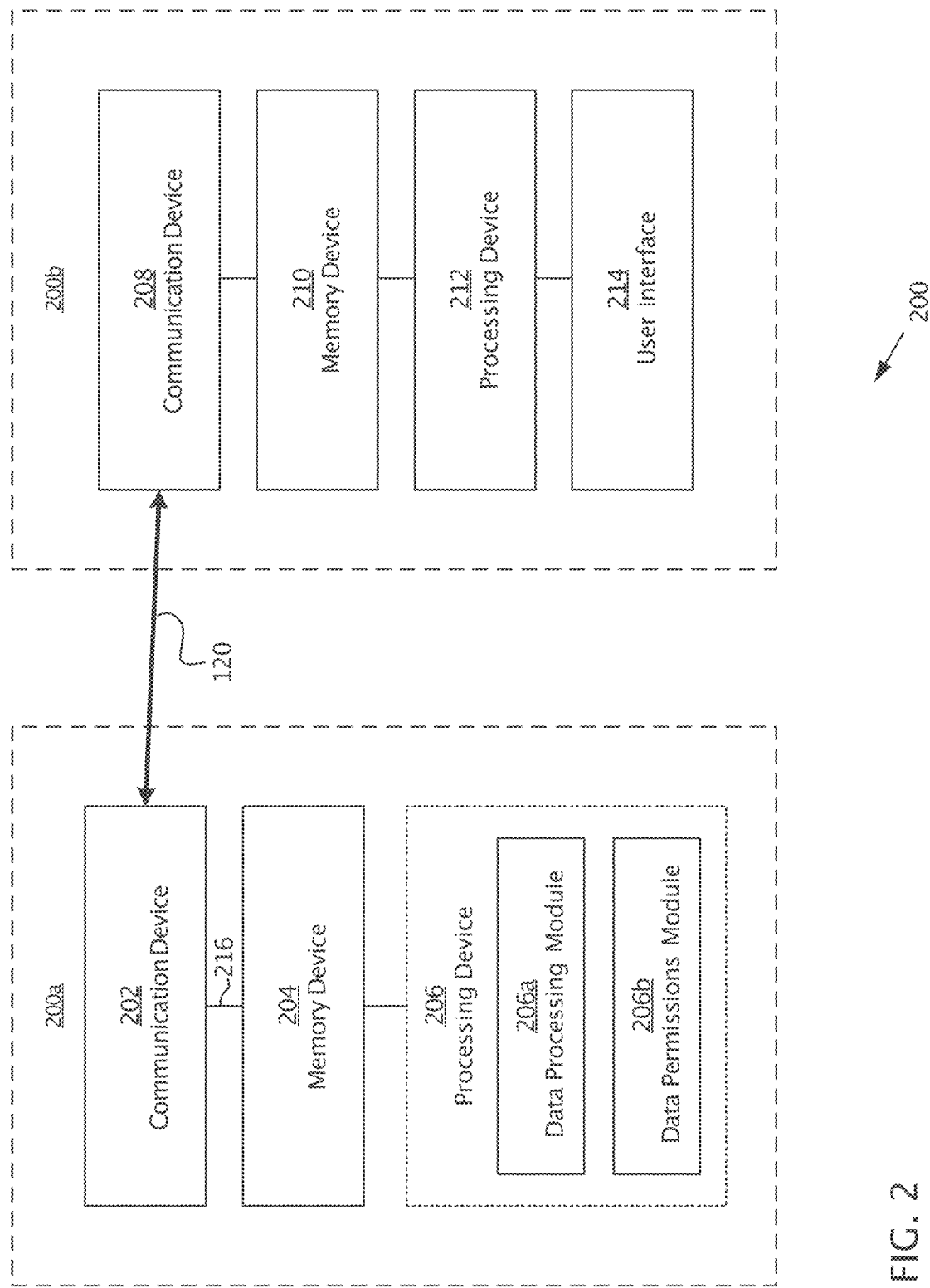
FIG. 2 illustrates a device schematic for various devices used in the communications relay system, according to an embodiment.

FIG. 2 illustrates a device schematic 200 for various devices used in the communications relay system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, and address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may be representative of various devices of the communications relay system 100. Various of the elements of the communications relay system 100 may include data storage and/or processing capabilities. Such capabilities may be rendered by various electronics for processing and/or storing electronic signals. One or more of the devices in the communications relay system 100 may include a processing device. For example, the cloud-based data management system 102, the user device 104, the smartphone 112, the personal computer 114, the external application server 116, and/or the external database 118 may include a processing device. One or more of the devices in the communications relay system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the communications relay system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may include random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the communications relay system 100 may include data communication capabilities. Such capabilities may be rendered by various electronics for transmitting and/or receiving electronic and/or electromagnetic signals. One or more of the devices in the communications relay system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various of the elements in the communications relay system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various of the devices in the communications relay system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the data analysis system 100 and/or various elements of the data analysis system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the data analysis system 100.

Figure 3:
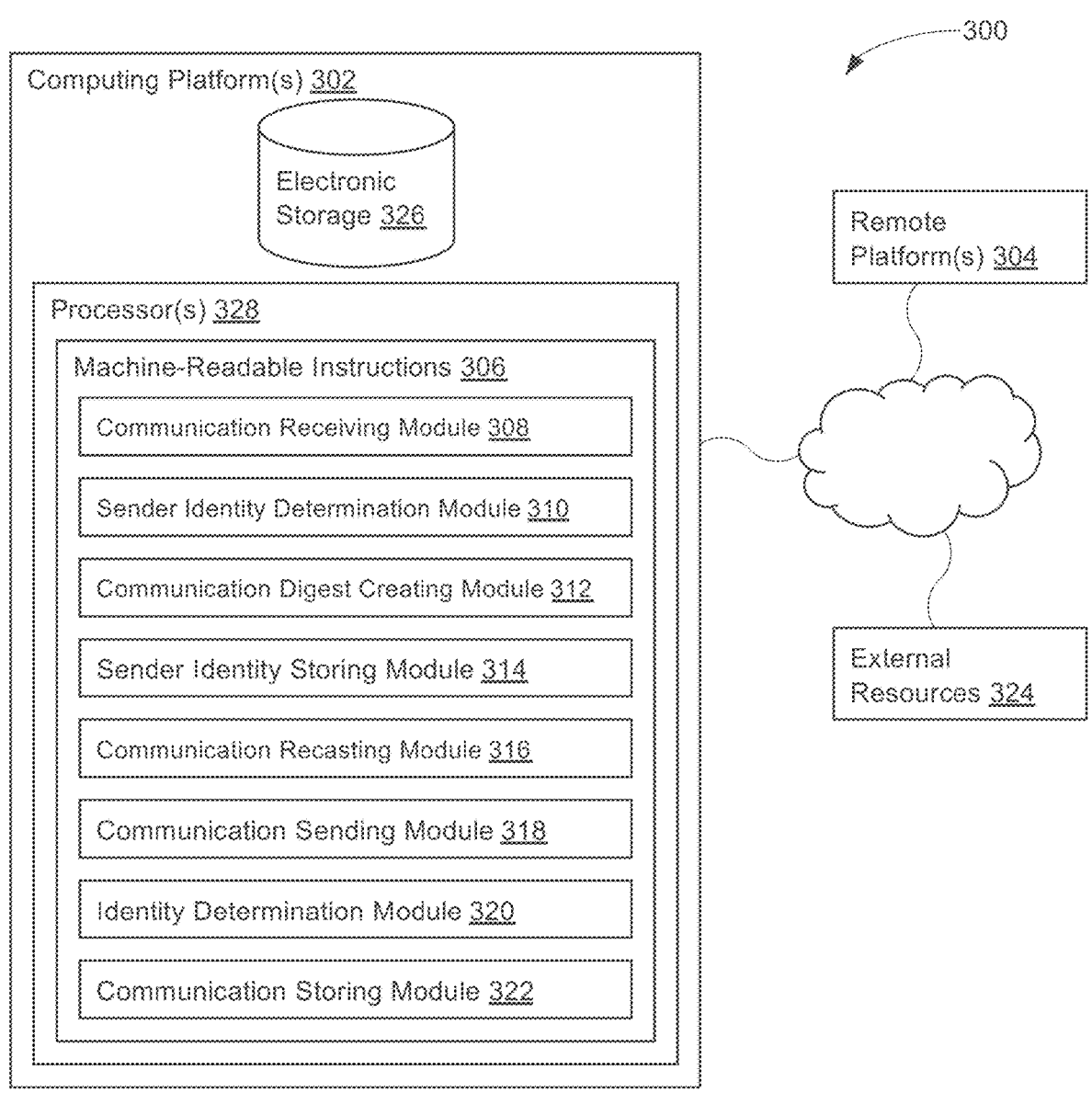
FIG. 3 illustrates a system for relaying a communication, according to an embodiment

FIG. 3 illustrates a system 300 for relaying a communication, according to an embodiment. In some embodiments, the system 300 may include one or more computing platforms 302. The computing platform(s) 302 may communicate with one or more remote platforms 304 (e.g., the user device 104 or the client device 200b) according to a client/server architecture, a peer-to-peer architecture, and/or other architectures. The remote platform(s) 304 may communicate with other remote platforms via the computing platform(s) 302 and/or according to a client/server architecture, a peer-to-peer architecture, and/or other architectures. Users may access the system 300 via the remote platform(s) 304.

The computing platform(s) 302 may be configured by machine-readable instructions 306. The machine-readable instructions 306 may include one or more instruction modules. The instruction modules may include computer program modules. The instruction modules may include one or more of a communication receiving module 308, a sender identity determination module 310, a communication digest creating module 312, a sender identity storing module 314, a communication recasting module 316, a communication sending module 318, an identity determination module 320, a communication storing module 322, and/or other instruction modules.

The communication receiving module 308 may receive, at a processing device of a communications server (e.g., the cloud-based data management system 102 or the server device 200a) including a networking device (e.g., including, inter alia, the communication devices 202 and 208, the communication link 120), which may enable electronic communication by the processing device with a user device and a third party device via a communications service (e.g., a cell carrier or internet service provider), an inbound communication from the third party device. In an example, the communications service may be a telephony service (e.g., a cell carrier or landline service), a short message system (SMS), a multimedia messaging service (MMS), or an email service (e.g., an internet service provider and/or standalone email provider service). In an example, the inbound communication may be a telephone call, a short message system (SMS) message, a multimedia messaging service (MMS) message, or an email. The inbound communication may be a telephone call. The relayed telephone call may include establishing a bridged voice connection between the third party device and the user device via the processing device.

The inbound communication may be a short message system (SMS) message. The inbound communication may be an email. In an example, the inbound communication may be a telephone call, a short message system message, a multimedia messaging service message, or an email.

The communication receiving module 308 may receive, at the processing device, a relayed outbound communication from the user device.

The sender identity determination module 310 may determine, using the processing device, a sender identity (e.g., a name, identifier code, key, phone number, email address, username, etc.) associated with the inbound communication.

The communication digest creating module 312 may create, using the processing device, an inbound communication digest of the inbound communication. The inbound communication digest may include the sender identity and an inbound communication content. The inbound communication digest may include, for example, a message, a message send time, and/or a property identifier. The property identifier may include, for example, an identification number, an address, or another identifier of a given real estate property or rental property.

The communication digest creating module 312 may create, using the processing device, an outbound communication digest of the relayed outbound communication.

The sender identity storing module 314 may store, using the processing device, the sender identity and the inbound communication digest on an electronic data storage unit, such as, for example, the memory device 204 or 210. The inbound communication may be a telephone call and wherein the determining the sender identity associated with the inbound communication includes identifying, using the processing device, the sender identity associated with a telephone number associated with the telephone call stored on the electronic data storage unit. The inbound communication may be a short message system message and wherein the determining the sender identity associated with the inbound communication includes identifying, using the processing device, the sender identity associated with a telephone number associated with the short message system message stored on the electronic data storage unit. The inbound communication may be an email and wherein the determining the sender identity associated with the inbound communication includes identifying, using the processing device, the sender identity associated with an email address associated with the email stored on the electronic data storage unit.

The communication recasting module 316 may recast, using the processing device, the inbound communication to a relayed inbound communication including the inbound communication and the sender identity. The relayed inbound communication may include the inbound communication digest. The sending the relayed inbound communication the user device may include executing the instruction on the processing device. The recasting the inbound communication to the relayed inbound communication may include creating an instruction to send a text content of the short message system message to the user device. The sending the relayed inbound communication the user device may include executing the instruction on the processing device.

The recasting the inbound communication to the relayed inbound communication may include creating an instruction to send a text content of the email to the user device. The sending the relayed inbound communication the user device may include executing the instruction.

The communication recasting module 316 may recast, using the processing device, the relayed outbound communication to an outbound communication. The outbound communication may include the outbound communication digest.

The communication sending module 318 may send, using the processing device, the relayed inbound communication to the user device. The communication sending module 318 may send, using the processing device, the outbound communication to the third party device. For example, the third party device may be the user device 104 or the client device 200b. The identity determination module 320 may determine, at the processing device, a recipient identity (e.g., a name, identifier code, key, phone number, email address, username, etc.) associated with the relayed outbound communication. The communication storing module 322 may store, using the processing device, the outbound communication digest on the electronic data storage unit.

In some implementations, the recasting the inbound communication to the relayed inbound communication may include creating an instruction to place a relayed telephone call to the user device. In some implementations, the recasting the relayed outbound communication to an outbound communication may include performing, using the processing device, a lookup of the identity associated with the third party device stored on the electronic data storage unit and creating an instruction to send a relayed outbound communication content to the third party device.

In some embodiments, the computing platform(s) 302, the remote platform(s) 304, and/or the external resources 324 may be operatively linked via one or more electronic communication links. For example, such electronic communication links may be established, at least in part, via a network such as the Internet and/or other networks using, for example, TCP/IP or cellular hardware enabling wired or wireless communication. It will be appreciated that this is not intended to be limiting, and that the scope of this disclosure includes embodiments in which the computing platform(s) 302, the remote platform(s) 304, and/or the external resources 324 may be operatively linked via some other communication media.

A given remote platform 304 may include one or more processors, which may execute computer program modules. The computer program modules may enable an expert or user associated with the given remote platform 304 to interface with the system 300 and/or the external resources 324, and/or provide other functionality attributed herein to the remote platform(s) 304. In an example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

The external resources 324 may include sources of information outside of system 300, external entities participating with the system 300, and/or other resources. In some embodiments, some or all of the functionality attributed herein to the external resources 324 may be provided by resources included in the system 300. For example, the external resources 324 may include, for example a cellular carrier or an internet service provider, or associated hardware with such services.

The computing platform(s) 302 may include an electronic storage 326, one or more processors 328, and/or other components similar to communications relay system 100. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

The electronic storage 326 may include non-transitory storage media that electronically stores information. The electronic storage media of the electronic storage 326 may include one or both of system storage that is provided integrally (i.e., substantially non-removable) with the computing platform(s) 302 and/or removable storage that is removably connectable to the computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 may include one or more virtual storage resources (e.g., cloud storage, a virtual private network, and/or other virtual storage resources). The electronic storage 326 may store software algorithms, information determined by the processor(s) 328, information received from the computing platform(s) 302, information received from remote platform(s) 304, and/or other information that enables the computing platform(s) 302 to function as described herein.

The processor(s) 328 may provide information processing capabilities in the computing platform(s) 302. As such, the processor(s) 328 may include one or more of a digital processor, an analog processor, a digital circuit designed to process information, an analog circuit designed to process information, a state machine, and/or other mechanisms for electronically processing information. Although the processor(s) 328 is shown in FIG. 3 as a single entity, this is for illustrative purposes only. In some embodiments, the processor(s) 328 may include a plurality of processing units. These processing units may be physically located within the same device, or the processor(s) 328 may represent processing functionality of a plurality of devices operating in coordination. The processor(s) 328 may execute the modules 308, 310, 312, 314, 316, 318, 320, and/or 322, and/or other modules. The processor(s) 328 may execute the modules 308, 310, 312, 314, 316, 318, 320, and/or 322, and/or other modules by software; hardware; firmware; some combination of software, hardware, and/or firmware; and/or other mechanisms for configuring processing capabilities on the processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

It should be appreciated that although the modules 308, 310, 312, 314, 316, 318, 320, and/or 322 are illustrated in FIG. 3 as being implemented within a single processing unit, in embodiments in which the processor(s) 328 includes multiple processing units, one or more of the modules 308, 310, 312, 314, 316, 318, 320, and/or 322 may be implemented remotely from the other modules. The description of the functionality provided by the different the modules 308, 310, 312, 314, 316, 318, 320, and/or 322 described below is for illustrative purposes, and is not intended to be limiting, as any of the modules 308, 310, 312, 314, 316, 318, 320, and/or 322 may provide more or less functionality than is described. For example, one or more of the modules 308, 310, 312, 314, 316, 318, 320, and/or 322 may be eliminated, and some or all of its functionality may be provided by other ones of the modules 308, 310, 312, 314, 316, 318, 320, and/or 322. As another example, the processor(s) 328 may execute one or more additional modules that may perform some or all of the functionality attributed below to one of the modules 308, 310, 312, 314, 316, 318, 320, and/or 322.

Figure 4A:
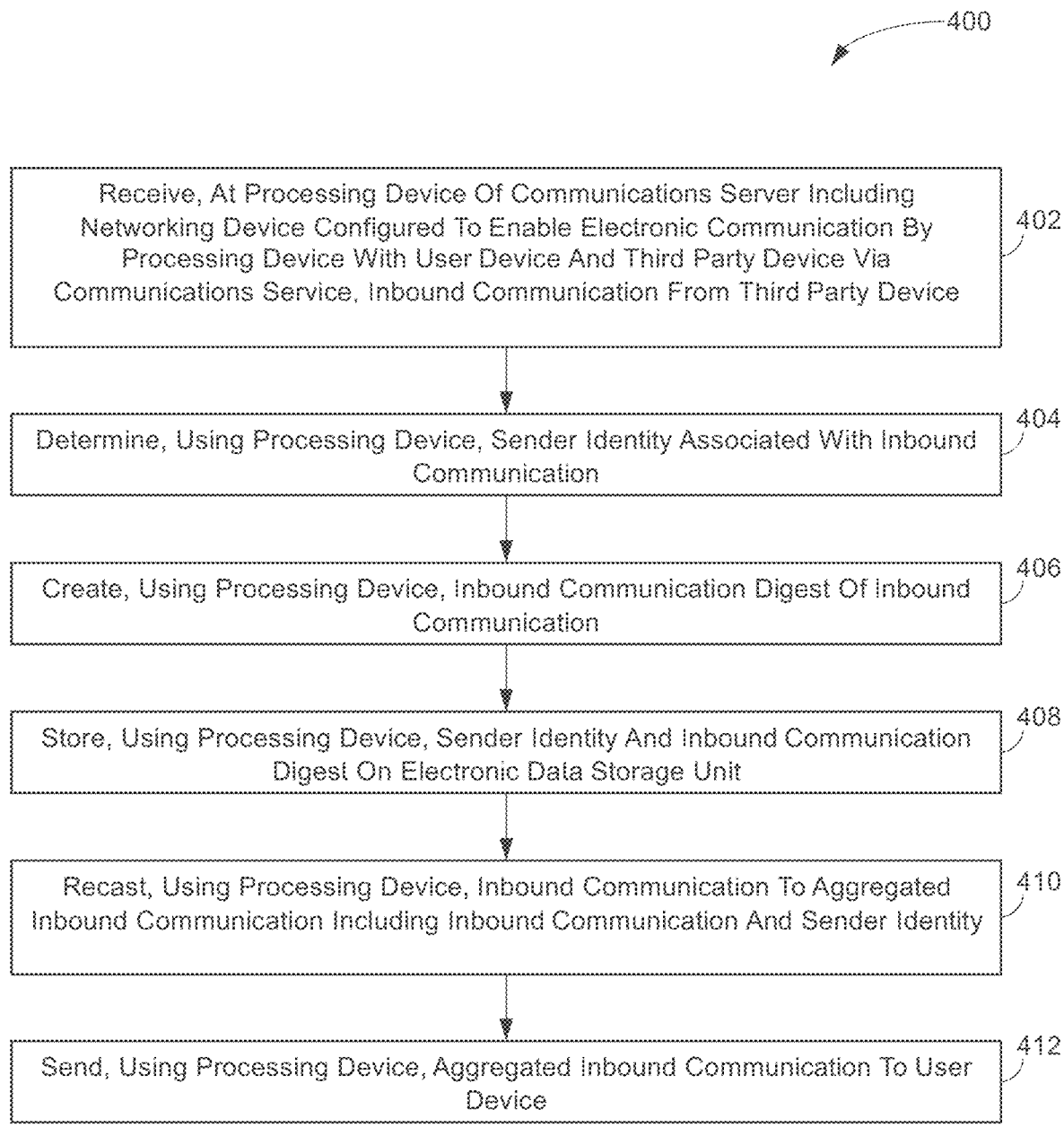
FIG. 4A illustrates a method for relaying a communication, according to an embodiment.

FIG. 4A illustrates the method 400, according to an embodiment. The method 400 may be used for relaying an inbound communication from a third party device to a user device.

An operation 402 may include receiving, at a processing device of a communications server including a networking device, which may enable electronic communication by the processing device with a user device and a third party device via a communications service, an inbound communication from the third party device. The operation 402 may be performed by one or more hardware processors configured by machine-readable instructions including a module that is the same as or similar to the communication receiving module 308, in accordance with one or more embodiments.

An operation 404 may include determining, using the processing device, a sender identity associated with the inbound communication. The operation 404 may be performed by one or more hardware processors configured by machine-readable instructions including a module that is the same as or similar to the sender identity determination module 310, in accordance with one or more embodiments.

An operation 406 may include creating, using the processing device, an inbound communication digest of the inbound communication. The inbound communication digest may include the sender identity and an inbound communication content. The operation 406 may be performed by one or more hardware processors configured by machine-readable instructions including a module that is the same as or similar to the communication digest creating module 312, in accordance with one or more embodiments.

An operation 408 may include storing, using the processing device, the sender identity and the inbound communication digest on an electronic data storage unit. The operation 408 may be performed by one or more hardware processors configured by machine-readable instructions including a module that is the same as or similar to the sender identity storing module 314, in accordance with one or more embodiments.

An operation 410 may include recasting, using the processing device, the inbound communication to a relayed inbound communication including the inbound communication and the sender identity. The operation 410 may be performed by one or more hardware processors configured by machine-readable instructions including a module that is the same as or similar to the communication recasting module 316, in accordance with one or more embodiments.

An operation 412 may include sending, using the processing device, the relayed inbound communication to the user device. The operation 412 may be performed by one or more hardware processors configured by machine-readable instructions including a module that is the same as or similar to the communication sending module 318, in accordance with one or more embodiments.

Figure 4B:
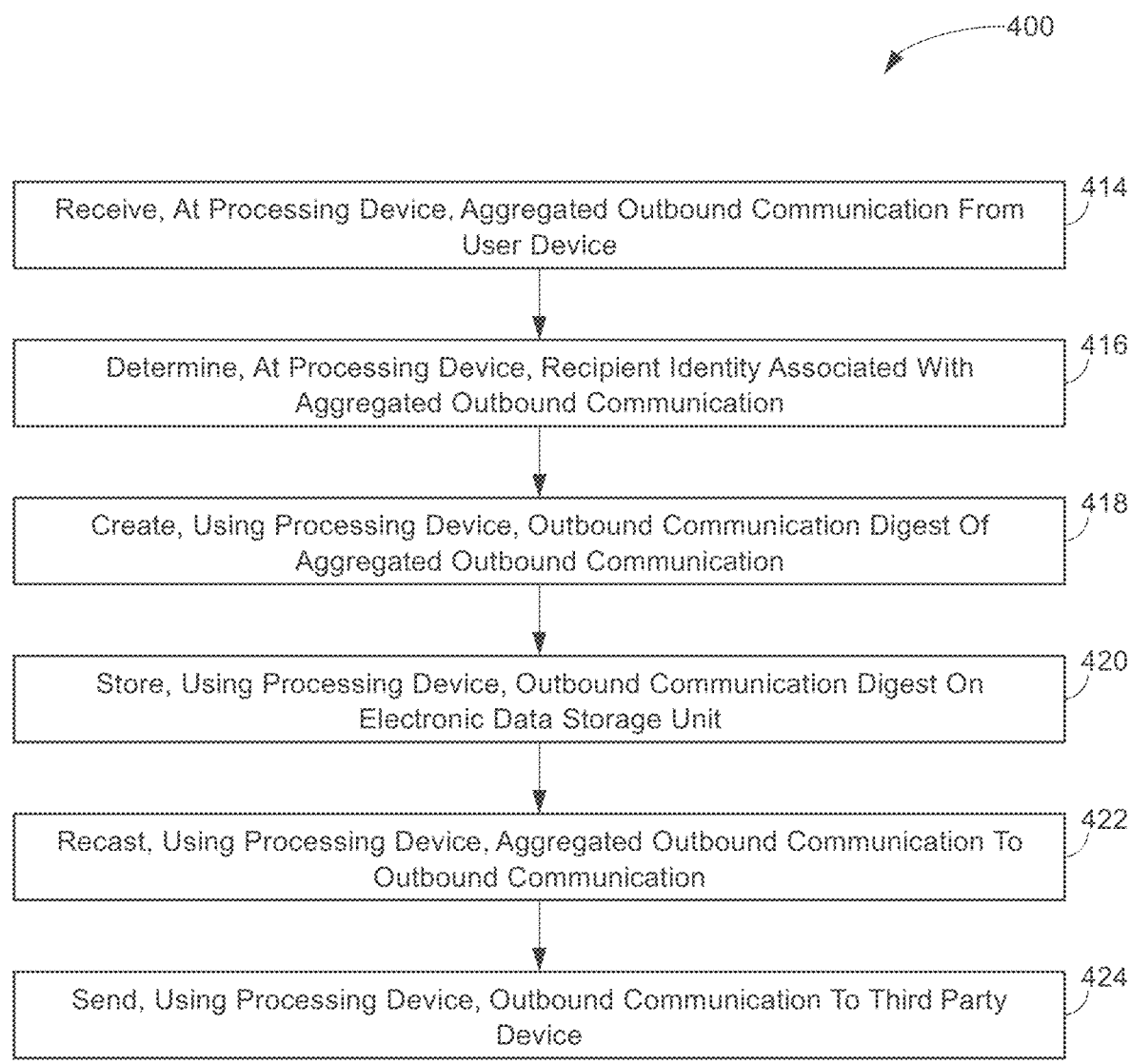
FIG. 4B illustrates an extension of a method for relaying a communication, according to an embodiment.

FIG. 4B illustrates an extension of method 400, according to an embodiment. The extension of method 400 may be used for relaying an inbound communication from a user device to a third party device.

An operation 414 may include receiving, at the processing device, a relayed outbound communication from the user device. The operation 414 may be performed by one or more hardware processors configured by machine-readable instructions including a module that is the same as or similar to the communication receiving module 308, in accordance with one or more embodiments.

An operation 416 may include determining, at the processing device, a recipient identity associated with the relayed outbound communication. The operation 416 may be performed by one or more hardware processors configured by machine-readable instructions including a module that is the same as or similar to the identity determination module 320, in accordance with one or more embodiments.

An operation 418 may include creating, using the processing device, an outbound communication digest of the relayed outbound communication. The operation 418 may be performed by one or more hardware processors configured by machine-readable instructions including a module that is the same as or similar to the communication digest creating module 312, in accordance with one or more embodiments.

An operation 420 may include storing, using the processing device, the outbound communication digest on the electronic data storage unit. The operation 420 may be performed by one or more hardware processors configured by machine-readable instructions including a module that is the same as or similar to the communication storing module 322, in accordance with one or more embodiments.

An operation 422 may include recasting, using the processing device, the relayed outbound communication to an outbound communication. Opera The operation 422 may be performed by one or more hardware processors configured by machine-readable instructions including a module that is the same as or similar to the communication recasting module 316, in accordance with one or more embodiments.

An operation 424 may include sending, using the processing device, the outbound communication to the third party device. The operation 424 may be performed by one or more hardware processors configured by machine-readable instructions including a module that is the same as or similar to the communication sending module 318, in accordance with one or more embodiments.

Various steps, functions, and/or operations of the computing platform(s) 302, the remote platform(s) 304, and/or the external resources 324 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 328 (or computing platform 302) or, alternatively, multiple processors 328 (or multiple computing platforms 302). Moreover, different sub-systems of the system 300 may include one or more computing or logic systems. Therefore, the above description should not be interpreted as a limitation on the present disclosure but merely an illustration.

Figure 5:
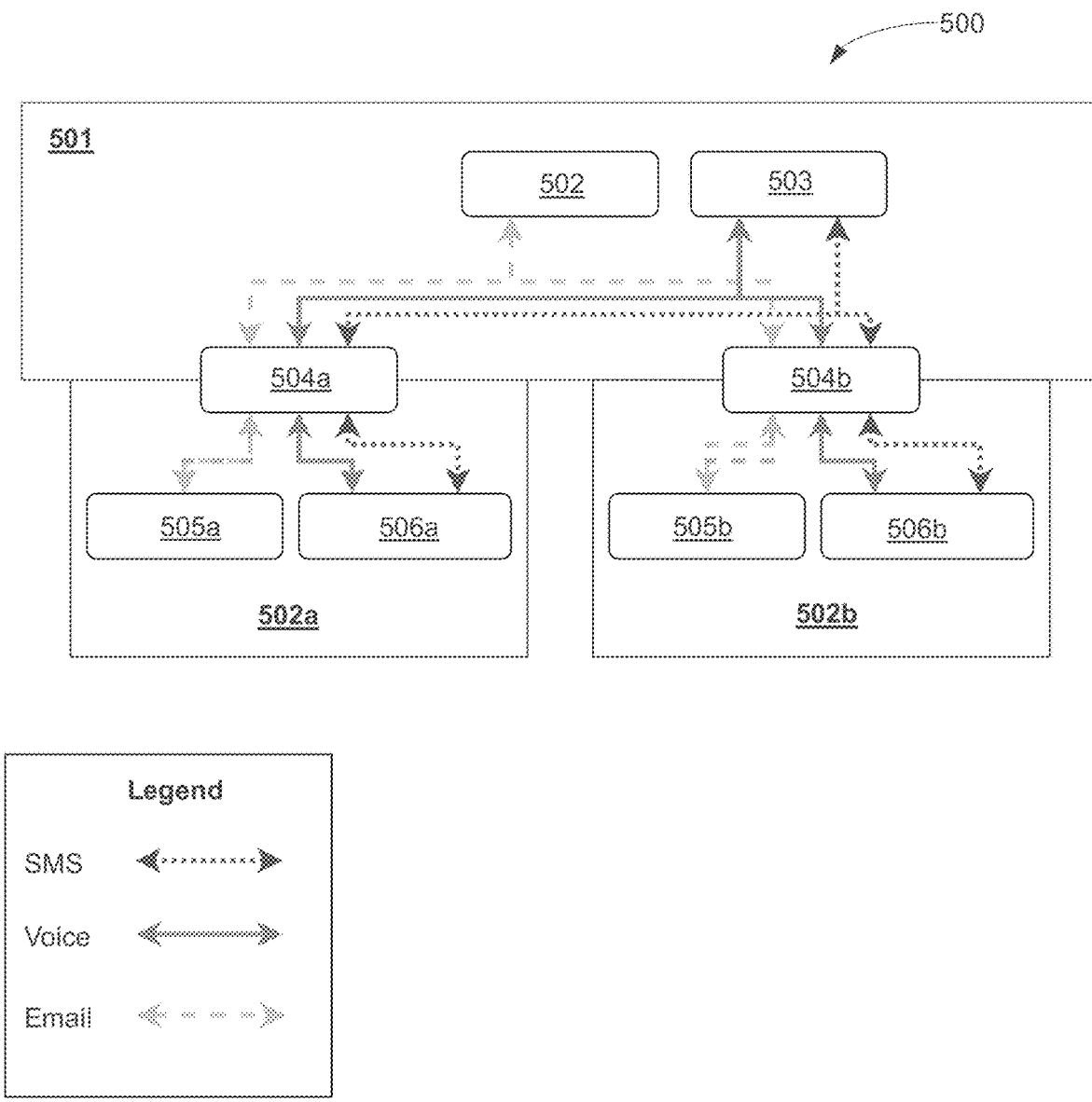
FIG. 5 illustrates an example communications relay, according to an embodiment.

FIG. 5 illustrates an example communications relay 500, according to an embodiment. The communications relay system 500 may provide for the aggregation of communications relayed to a customer 501 (e.g., a landlord) from various contacts 502a and 502b (e.g., tenants or prospective tenants) having identities 504a and 504b, respectively.

The customer 501 may have communications channels including a private email 502 and a private phone 503. The contacts 502a and 502b may have private emails 505a and 505b, respectively, and private phones 506a and 506b, respectively. Using the communications relay system 500, each contact 502a and 502b may communicate through their respective identities 504a and 504b, respectively, with the customer 501. Such communications may be via, for example telephone (e.g., voice calling), SMS, or email, and may be aggregated to their respective identities 504a and 504b from the point of view of the customer 501.

Figure 6:
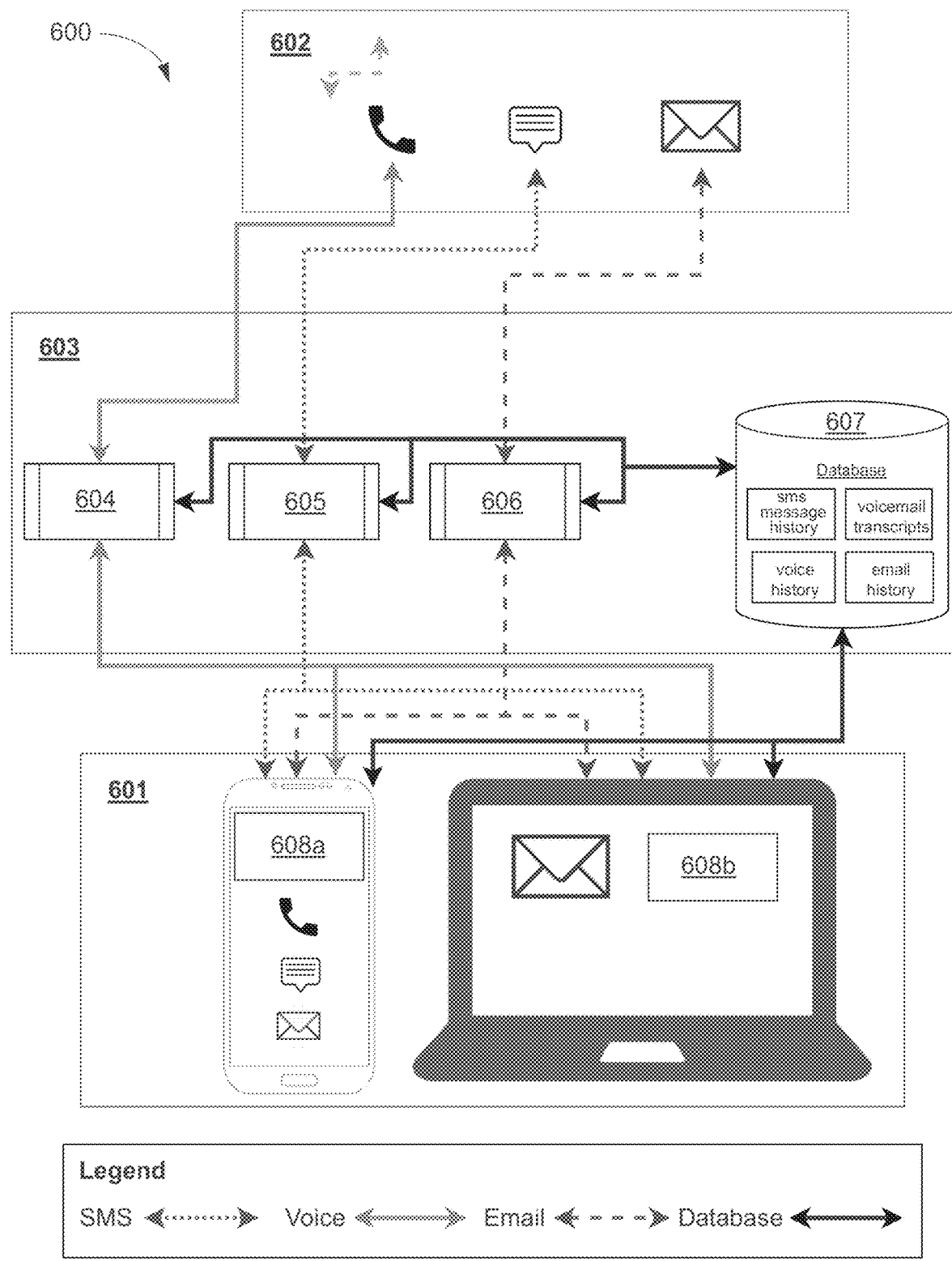
FIG. 6 illustrates a further example communications relay, according to an embodiment.

FIG. 6 illustrates a further example communications relay 600, according to an embodiment. The communications relay 600 may provide for the aggregation of communications relayed to or from a user customer device 601 (e.g., a landlord's device) from or to a third-party contact device 602 (e.g., a tenant's or a prospective tenant's device) via a communications relay system 603.

The communications relay system 603 may be similar to system 100, 200, or 300, and may provide for two-way communications with the customer device 601 and the contact device 602 and may mediate communications therebetween. To effect this, the communications relay system may include a voice relay subsystem 604, an SMS relay subsystem 605, and an email relay subsystem 606. The communications relay system 603 may further include a database 607 for storing communications records (e.g., identities related to and digests of communications). A customer device 601 may be, for example, a smartphone 608a or a laptop computer 608b.

Figure 7:
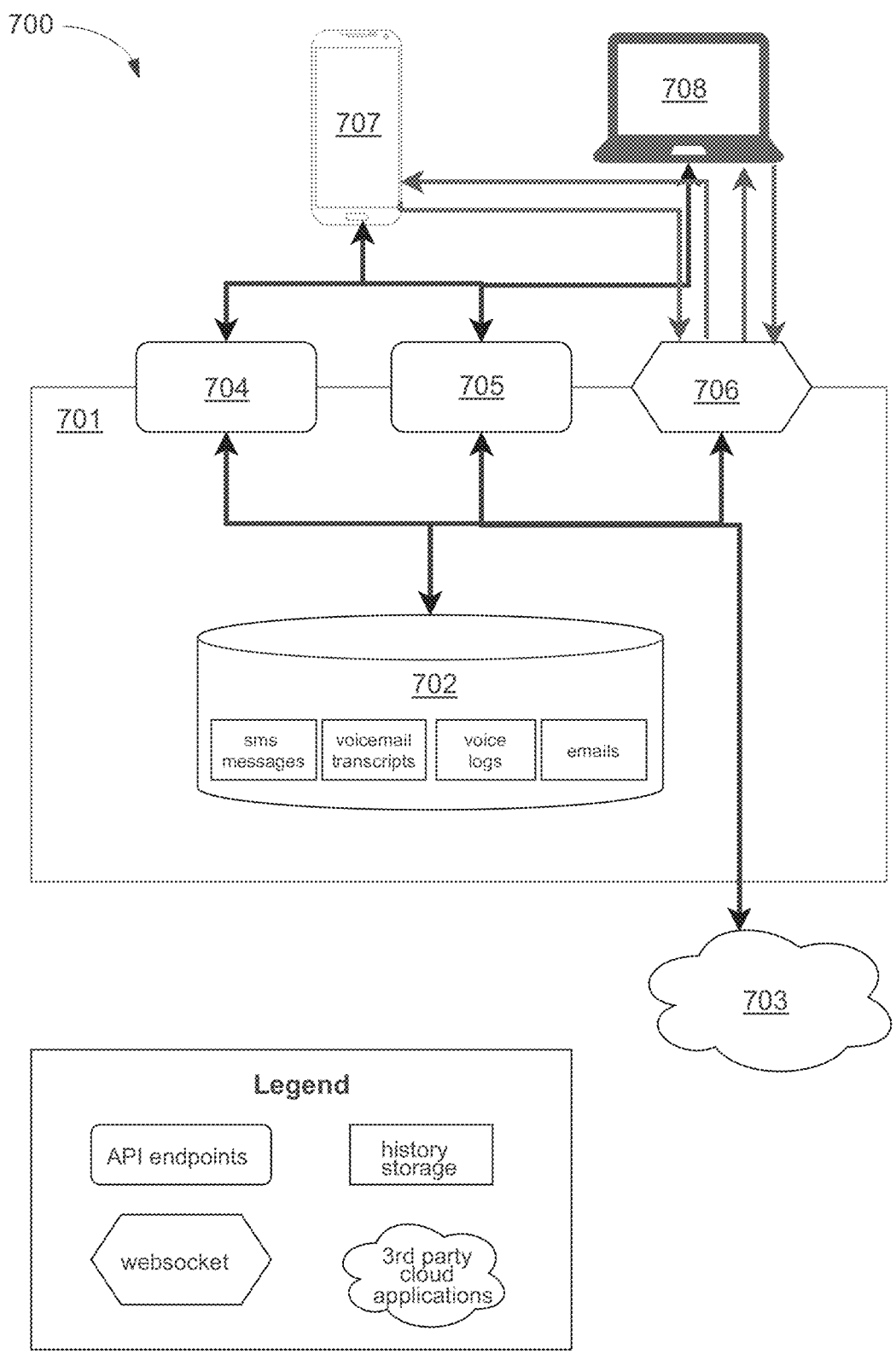
FIG. 7 illustrates a flowchart of a unified communication inbox, according to an embodiment.

FIG. 7 illustrates a flowchart 700 of a unified communication inbox 701, according to an embodiment. The unified communication inbox 701 may provide for the customer (e.g., the user or the landlord) to receive, view, and respond to communications received from varying channels in one place.

The unified communication inbox 701 may include a database 702, which may contain records of communications, such as SMS messages, voicemail transcripts, voice logs, and emails. The unified communications inbox may further have access to a user's cloud voicemail storage 703. Devices 707 and 708 may be able to access the data stored in the unified communications inbox via operations including a request to get conversations 704, a request to get messages 705, and a messages WebSocket 706.

Figure 8:
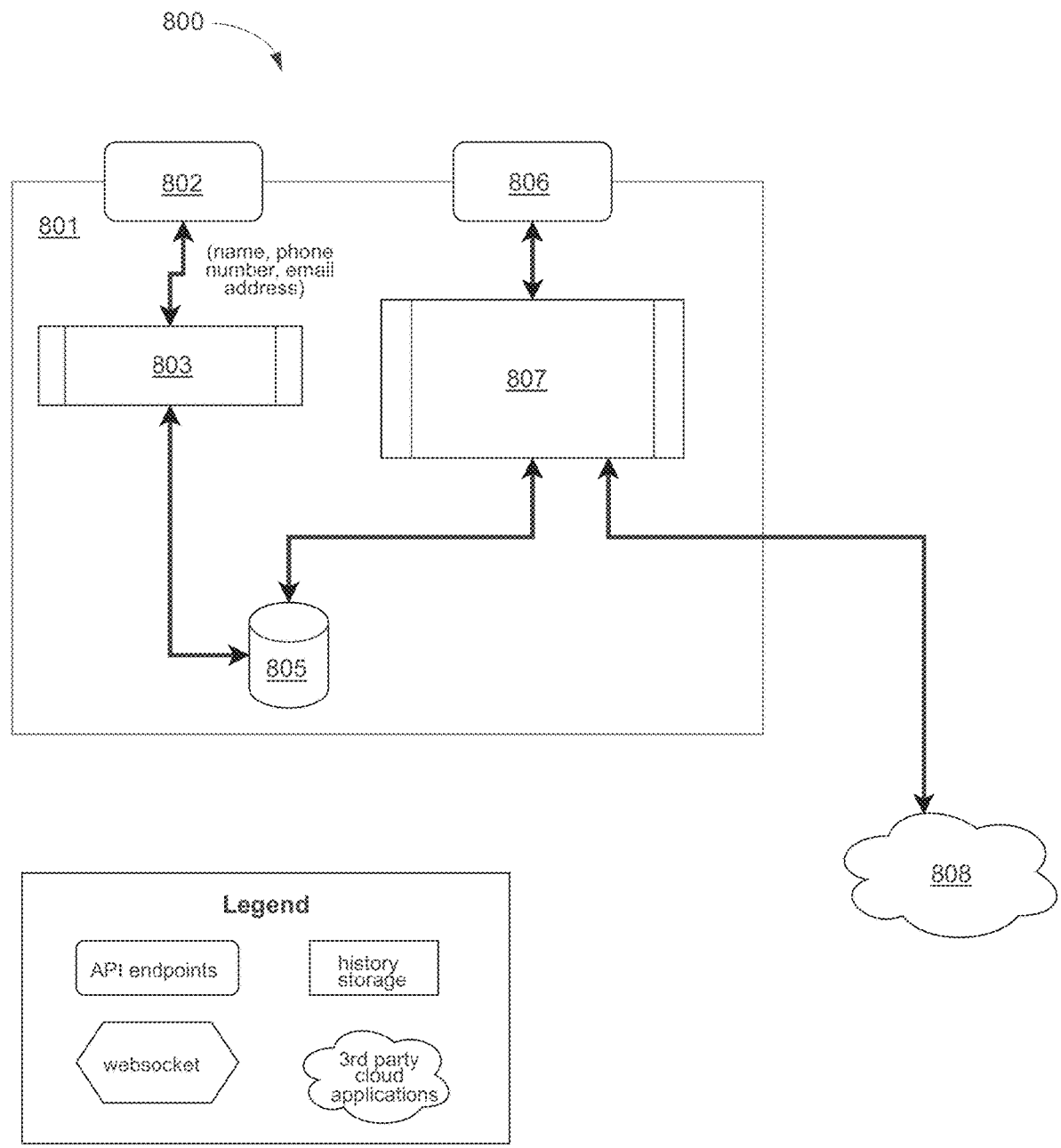
FIG. 8 illustrates a flowchart of a user setup and identity creation, according to an embodiment.

FIG. 8 illustrates a flowchart 800 of a user setup and identity creation, according to an embodiment. User setup may enable new users to be set up as customers with a unified inbox to aggregate and relay inbound and outbound communications.

Within a user setup module 801, an instruction may be received at an input point 802 to create a user. At 803, a user may be created with new records initialized in a database 805. Creation of an identity of the user may be initiated at 806, which may initiate, at 807, creation of an identity for the user, associate the identity with the user, create a unique code for the identity of the user, create a unique email address for the identity of the user, and provision a phone number for the identity of the user (in coordination with a third party telephony provider 808), records of all of which may be stored in the database 805.

Figure 9:
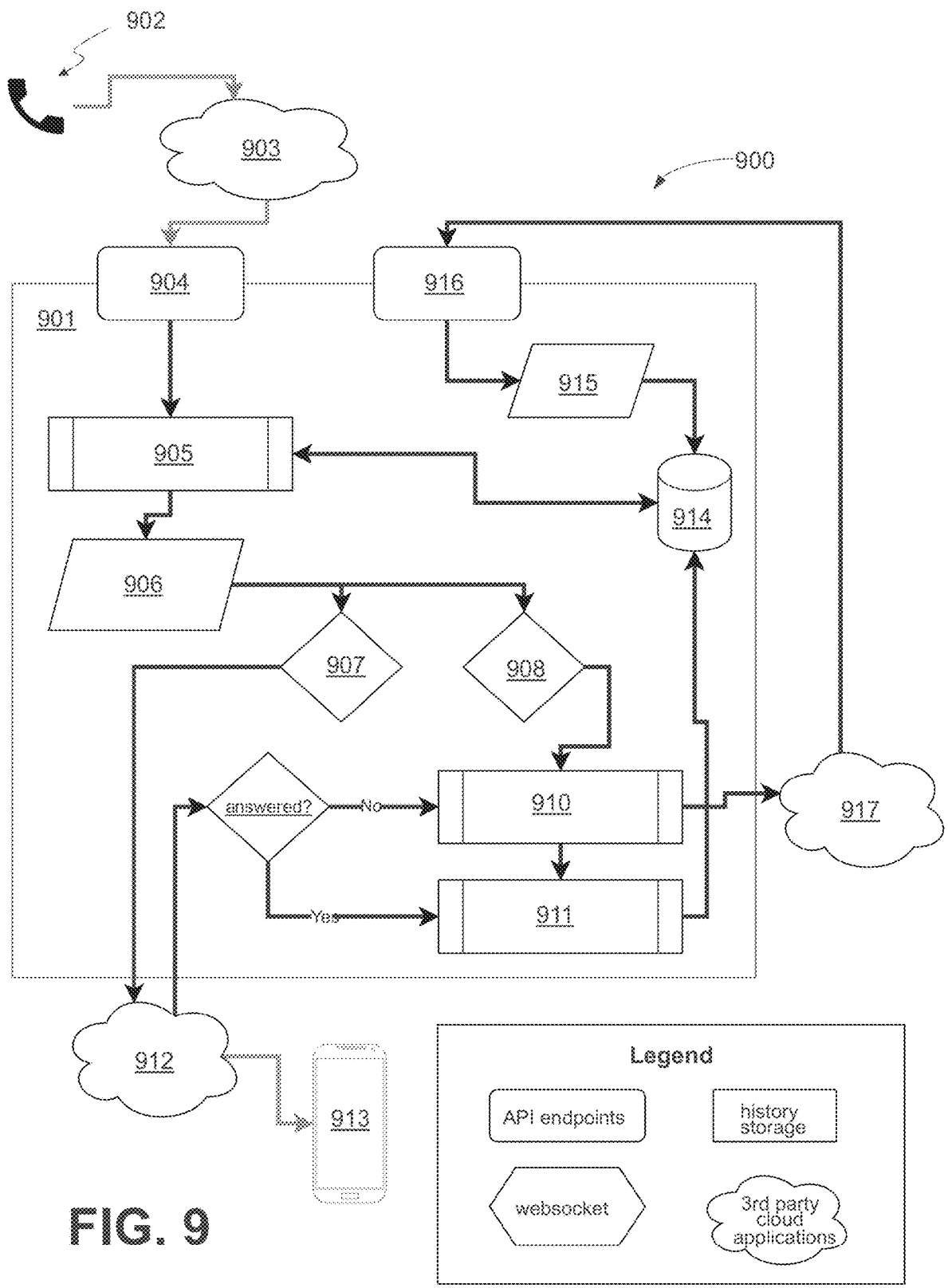
FIG. 9 illustrates a flowchart of an inbound voice communication, according to an embodiment.

FIG. 9 illustrates a flowchart 900 of an inbound voice communication, according to an embodiment. A communications relay system 901 may provide for aggregation and relay of inbound voice communications from a contact's (e.g., a third party's or tenant's or prospective tenant's) device 902 to a customer's (e.g., a user's or landlord's) device 913.

A contact may initiate a call with a designated number using their contact phone (e.g., handset) 902 via a third-party telephone provider 903. The call may be received by the communications relay system at 904, and the identity of the caller may be looked up based on the caller's phone number at 905 from a database 914. At 906, the identity may be set up for the call, for example, the call may be routed to a private phone number, patched to another system, or sent to voicemail. If the configuration indicates to place the call to the customer, a call may be placed at 907, implemented via another third party telephony provider 912 to the customer's device 913. If the customer does answer, the call log information may be saved at 911 to the database 914. If the customer does not answer, or if the configuration sends the call to voicemail at 908, at 910 a voicemail may be recorded, transcribed at 917, and the call information 916 and call transcript 915 may be stored to the database 914.

Figure 10:
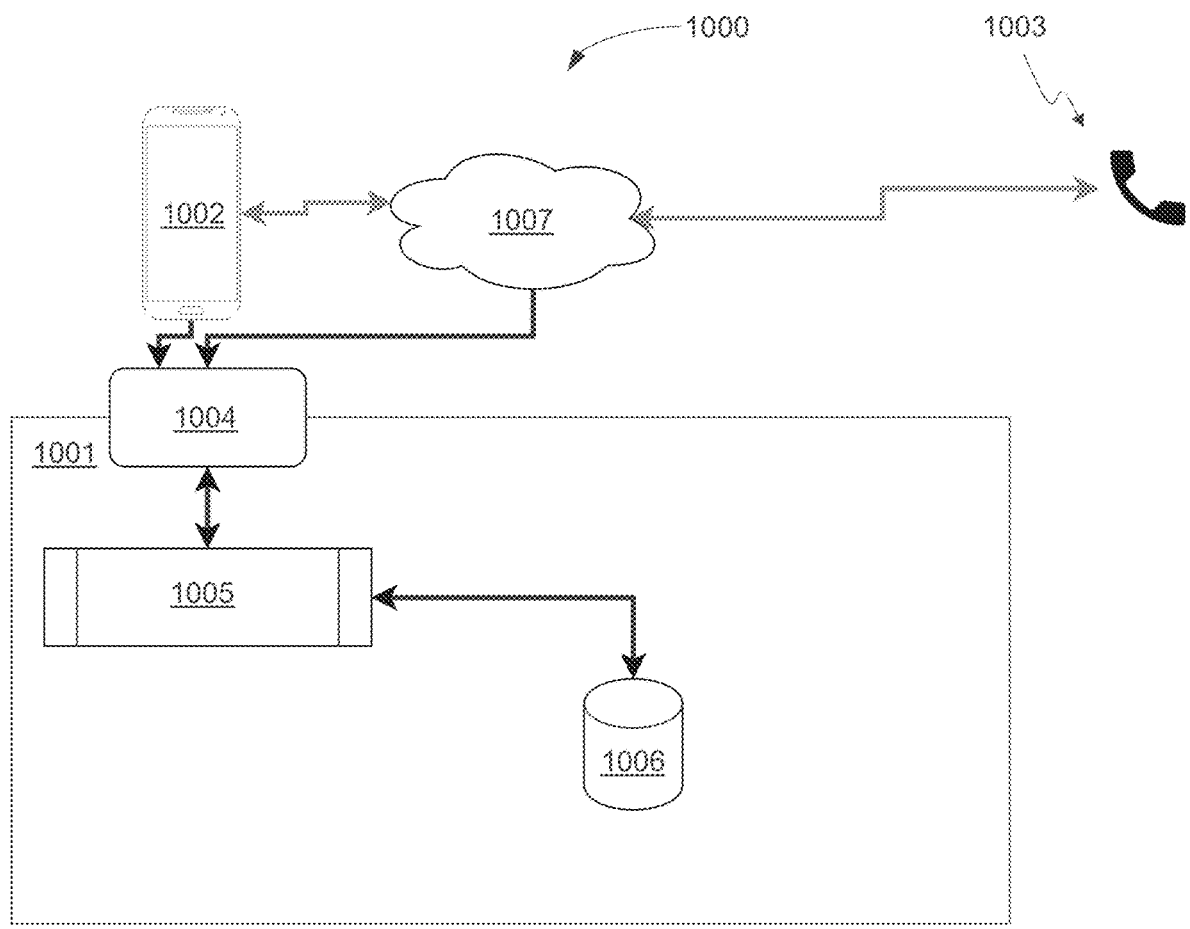
FIG. 10 illustrates a flowchart of an outbound voice communication implementing WebRTC, according to an embodiment.
Figure 10:
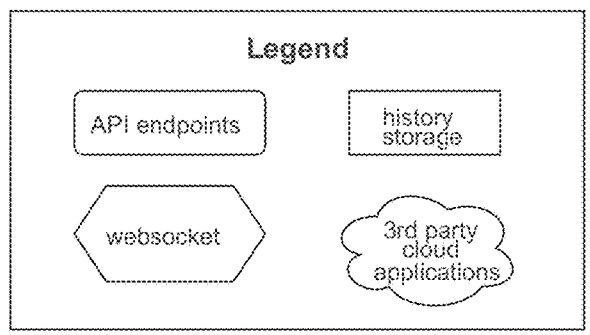

FIG. 10 illustrates a flowchart 1000 of an outbound voice communication implementing Web real-time communication (WebRTC), according to an embodiment. A communications relay system 1001 may provide for aggregation and relay of outbound voice communications from a customer's (e.g., a user's or landlord's) device 1002 to a contact's (e.g., a third party's or tenant's or prospective tenant's) device 1003.

WebRTC may provide web browsers and mobile applications with real-time communication via simple application programming interfaces (APIs), enabling audio and video communication to work inside web pages by allowing direct peer-to-peer communication without plugins or other third-party applications.

The WebRTC-enabled user device 1002 may place a call via a third-party telephone provider 1007 to a third-party device 1003, and the call information may be input at 1004 to the communications relay system 1001. With the call information, at 1005, the identity of the third party may be looked up based on the calling phone number from the database 1006 and the call information may be saved to the database 1006.

Figure 11:
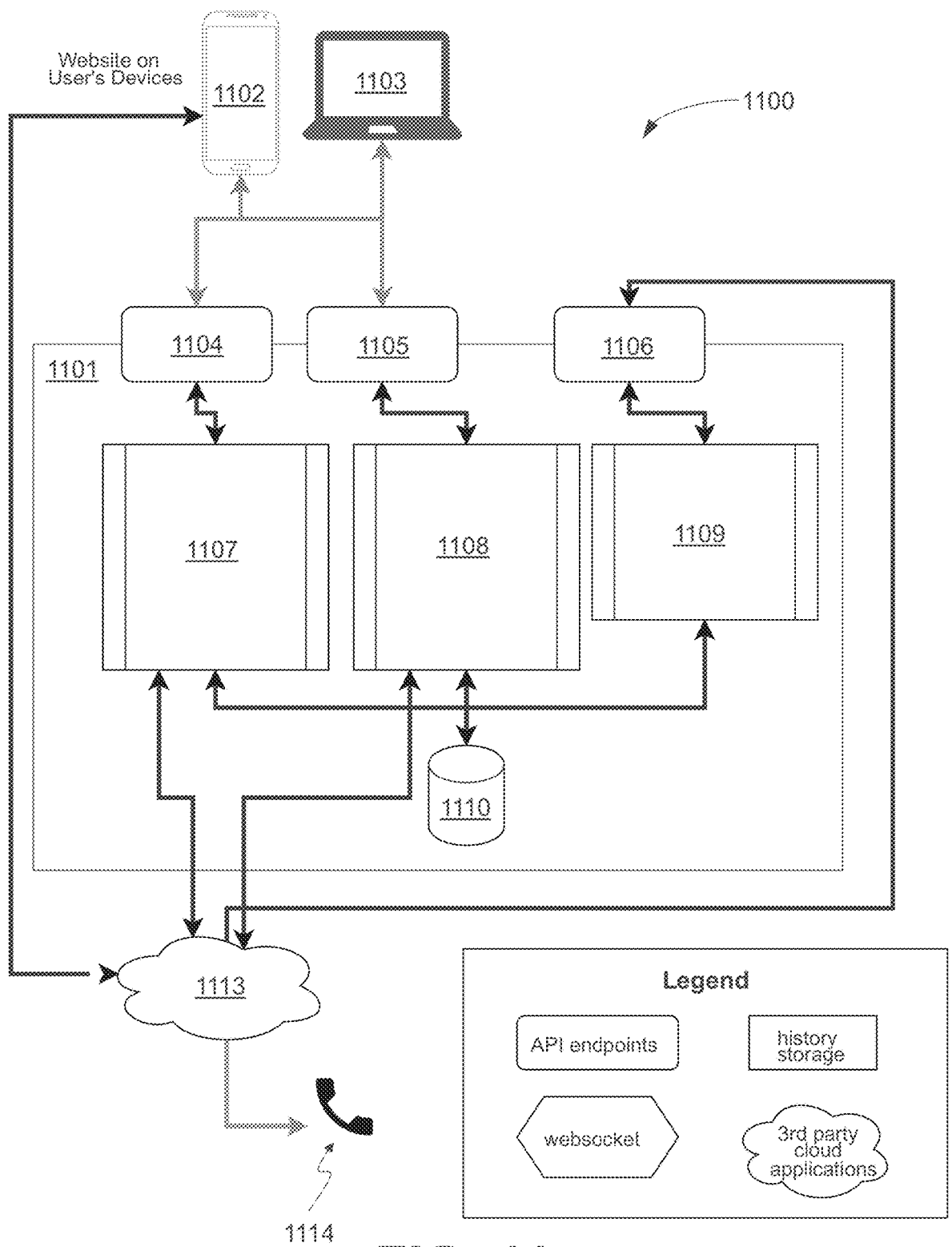
FIG. 11 illustrates another example flowchart of an outbound voice communication implementing a voice bridge, according to an embodiment.

FIG. 11 illustrates another example flowchart 1100 of an outbound voice communication implementing a voice bridge, according to an embodiment. A communications relay system 1101 may provide for aggregation and relay of outbound voice communications from a customer's (e.g., a user's or landlord's) device 1102/1103 to a contact's (e.g., a third party's or tenant's or prospective tenant's) device 1114.

The communications relay system 1101 may implement a voice bridge by, upon receiving a call from the user's device 1102/1103, make a call to a contact at 1104 or reply to a call from a conversation 1005. At 1107 or 1108, an identity may be looked up from a database 1110, call information may be saved to the database 1110 (and to an existing conversation if available), the contact's number may be looked up from the database, and the contact's phone 1114 may be called via a third-party telephony provider 1113. At 1109 and upon completion of the call at 1106 the identity may be once again looked up from the database 1110 and call information may be stored in the database 1110 (tied to an existing conversation if available).

Figure 12:
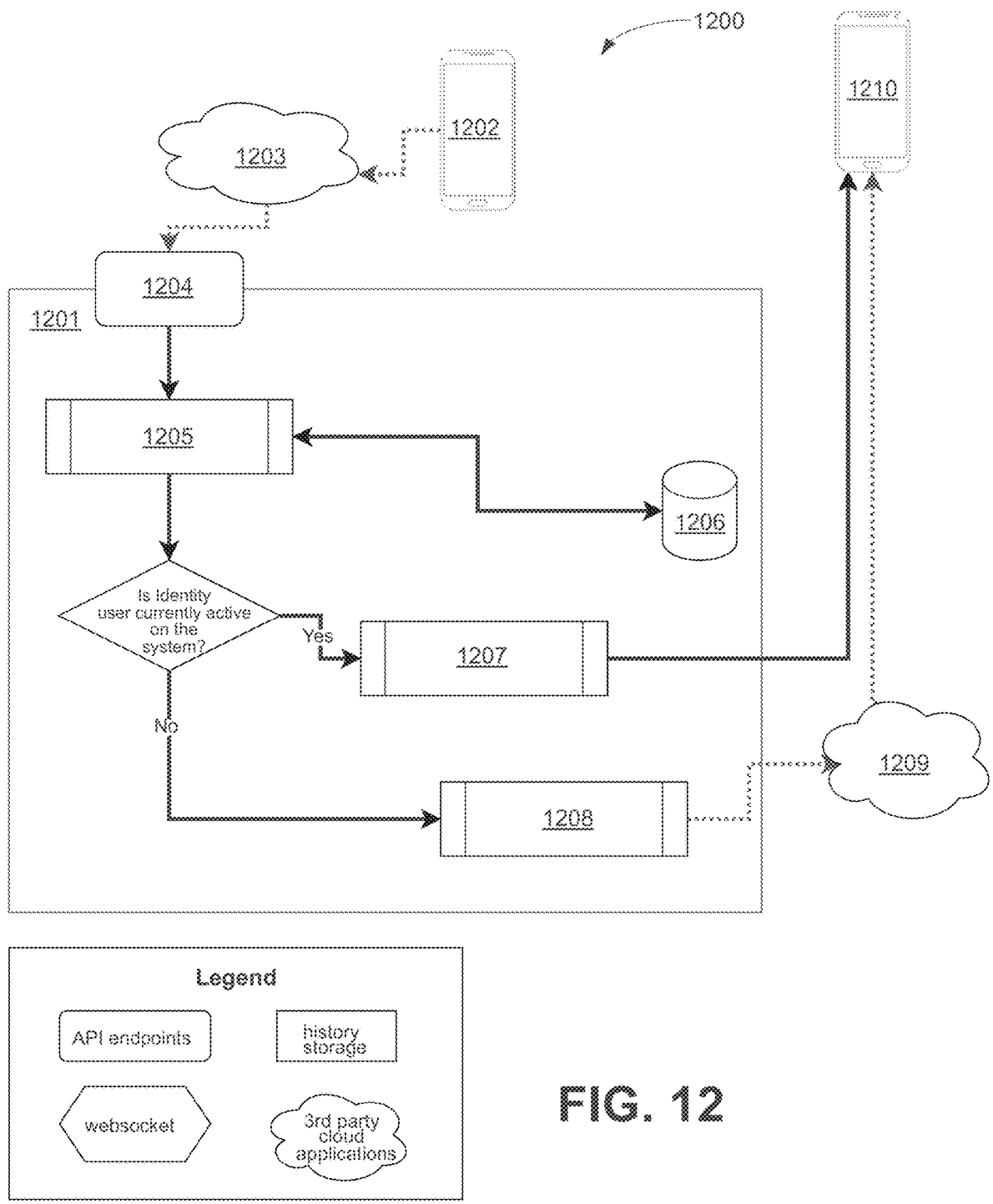
FIG. 12 illustrates a flowchart of an incoming SMS communication, according to an embodiment.

FIG. 12 illustrates a flowchart 1200 of an incoming SMS communication, according to an embodiment. A communications relay system 1201 may provide for aggregation and relay of inbound SMS communications from a contact's (e.g., a third party's or tenant's or prospective tenant's) device 1202 to a customer's (e.g., a user's or landlord's) device 1210.

The contact's device may send an SMS via a third-party telephony provider 1203, which may be received at 1204 by the communications relay system 1201. At 1205, an identity of the sender may be looked up, based on the incoming phone number, in a database 1206 and a copy of the SMS message contents may be stored in the database 1206. If the identity of the user is currently active, the SMS may be relayed at 1207 to the customer's device 1210 directly. If not, a new message notification may be sent at 1208 via a third party telephony provider 1209 to the customer's device 1210.

Figure 13:
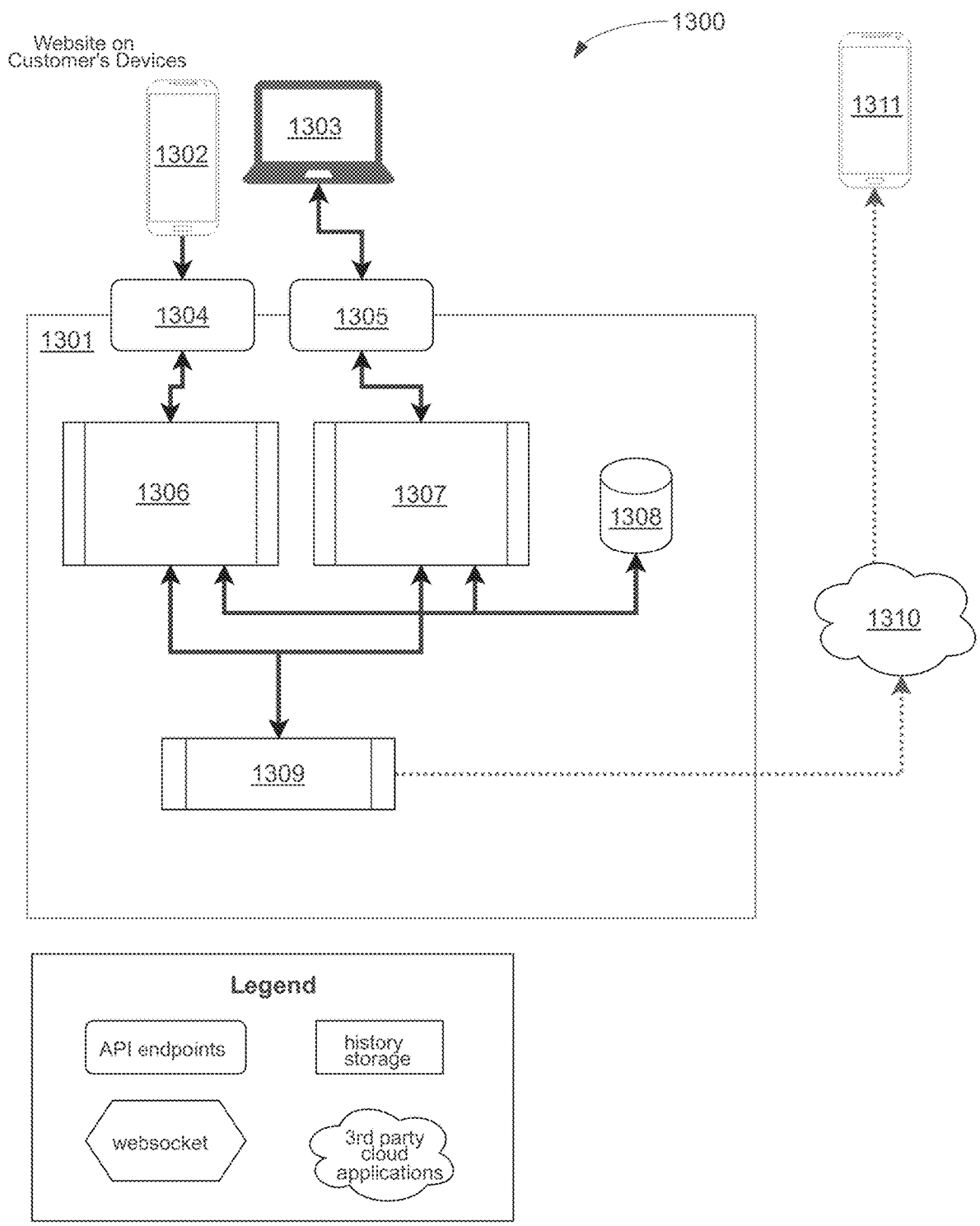
FIG. 13 illustrates a flowchart of an outgoing SMS communication from a website, according to an embodiment.

FIG. 13 illustrates a flowchart 1300 of an outgoing SMS communication from a website, according to an embodiment. A communications relay system 1301 may provide for aggregation and relay of outbound SMS communications from a customer's (e.g., a user's or landlord's) device 1302/1303 to a contact's (e.g., a third party's or tenant's or prospective tenant's) device 1311.

The customer's device 1302/1303 may initiate an SMS message (e.g., in reply to a received SMS message, email, or call) at 1304 or 1305, which may be part of a conversation. At 1306/1307, an identity associated with the intended recipient of the SMS message may be looked up from a database 1308, and the outgoing SMS message may be saved in the database 1308 (attached to an existing conversation, if applicable). At 1309, the communications relay system 1301 may send the SMS message via a third party telephony provider 1310 to the contact's device 1311.

Figure 14:
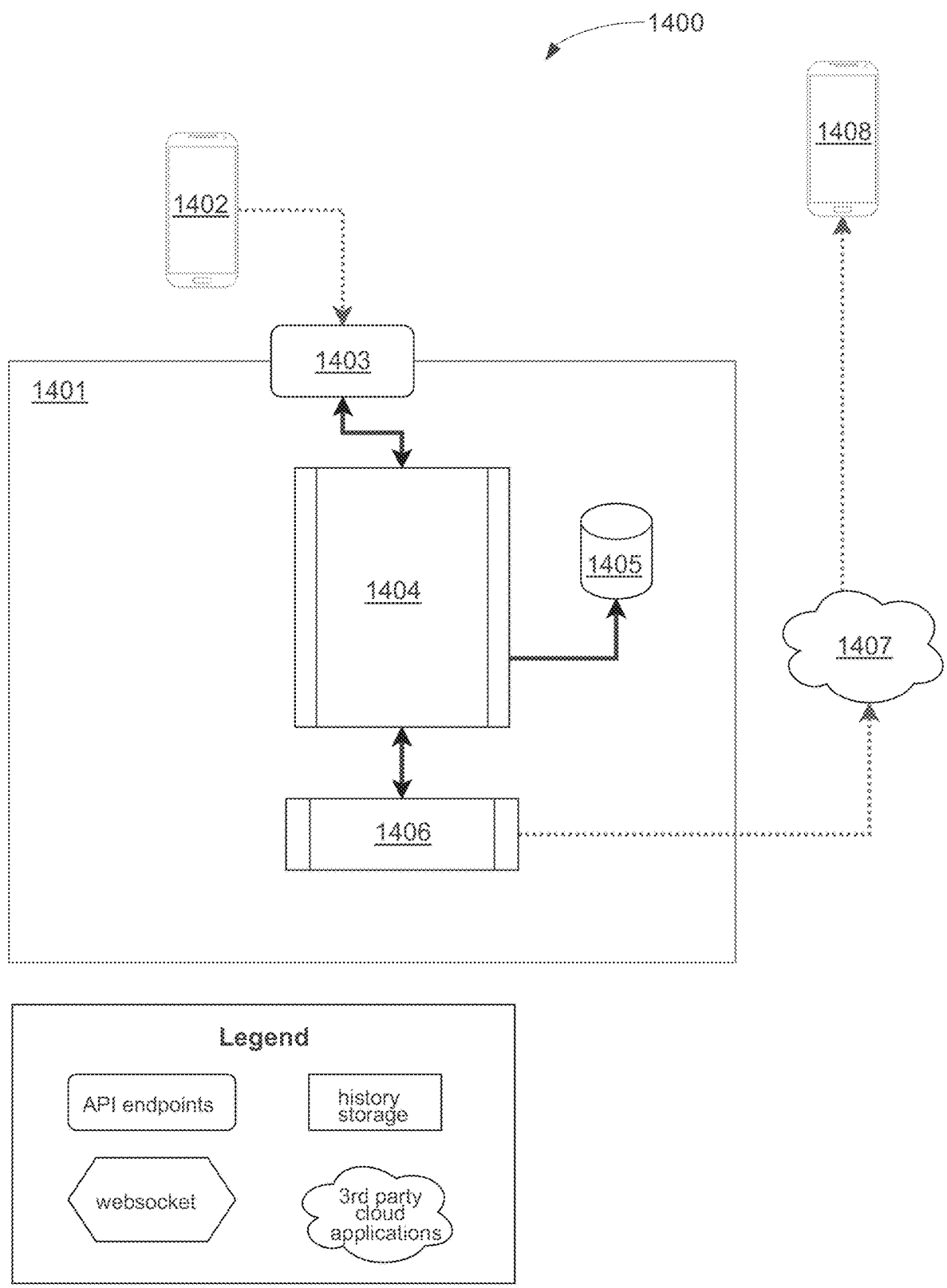
FIG. 14 illustrates a flowchart of an outgoing SMS communication from a phone number pool, according to an embodiment.

FIG. 14 illustrates a flowchart 1400 of an outgoing SMS communication from a phone number pool, according to an embodiment. A communications relay system 1401 may provide for aggregation and relay of outbound SMS communications from a customer's (e.g., a user's or landlord's) device 1402 to a contact's (e.g., a third party's or tenant's or prospective tenant's) device 1408.

The customer's device 1402 may reply to an SMS conversation at 1403, where each new SMS conversation is assigned a temporary phone number from a phone number pool and is used to send/receive texts from the customer's device 1402. At 1404, the conversation may be looked up in a database 1405 based on the currently-assigned conversation phone number, as well as the identity of the intended recipient contact, and the message may be saved to the database 1405. The SMS message may then be sent at 1406 via a third-party telephony provider 1407 to the contact's device 1408.

Figure 15:
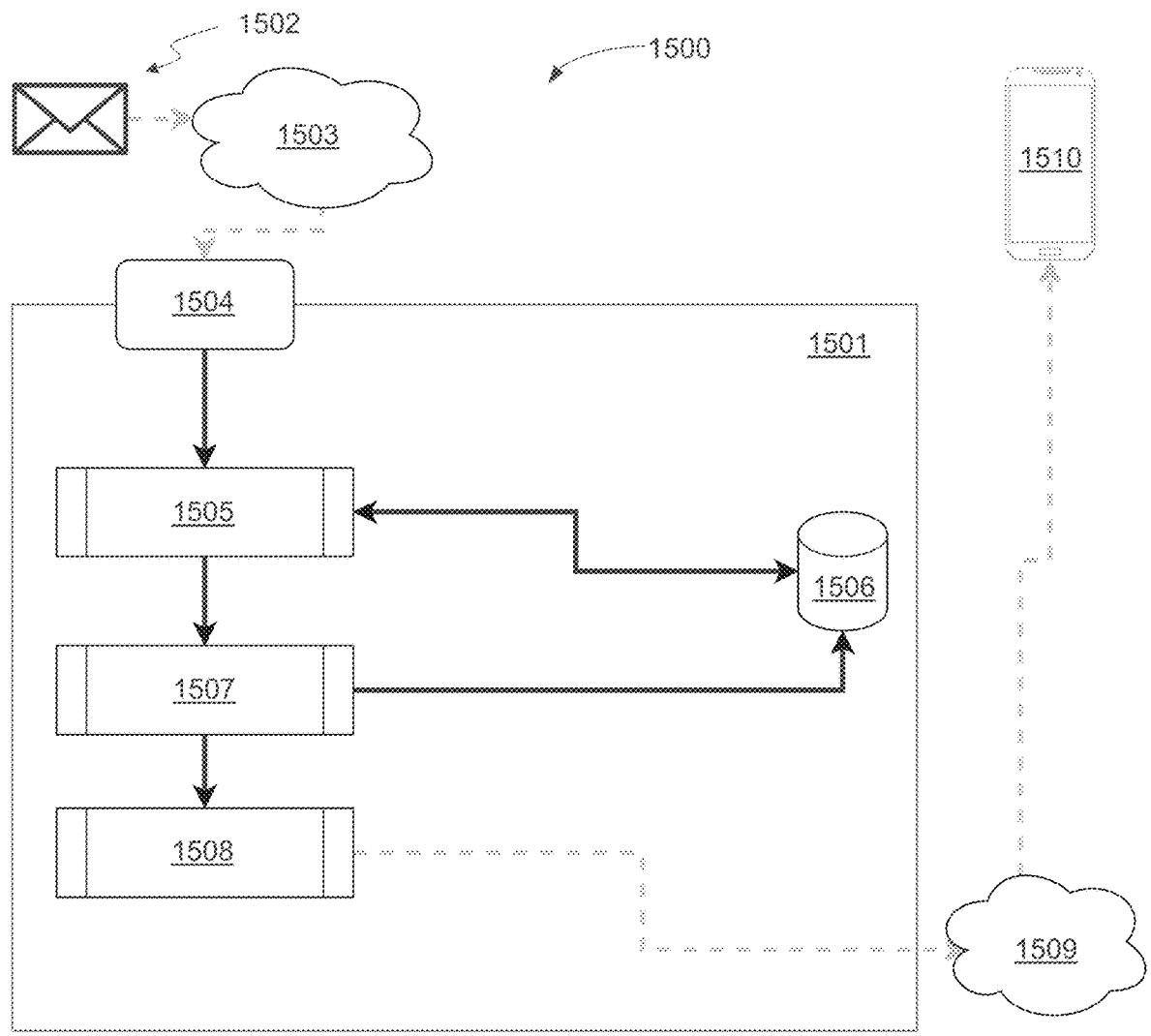
FIG. 15 illustrates a flowchart of an incoming email communication, according to an embodiment.

FIG. 15 illustrates a flowchart 1500 of an incoming email communication, according to an embodiment. A communications relay system 1501 may provide for aggregation and relay of inbound email communications from a contact's (e.g., a third party's or tenant's or prospective tenant's) email service 1502 to a customer's (e.g., a user's or landlord's) device 1510.

A contact may initiate an email communication via their email service 1502, which may be routed to the communications relay system 1501 via a third party email provider 1503 and received by the communications relay system at 1504. At 1505, an identity may be looked up in a database 1506 based on the email address from which the incoming email was received. At 1507, the email may be saved to the database 1506. The email may then be forwarded to the identity's private email address at 1508 via another third party email provider 1509 to the customer's email inbox or unified inbox accessible on the customer's device 1510.

Figure 16:
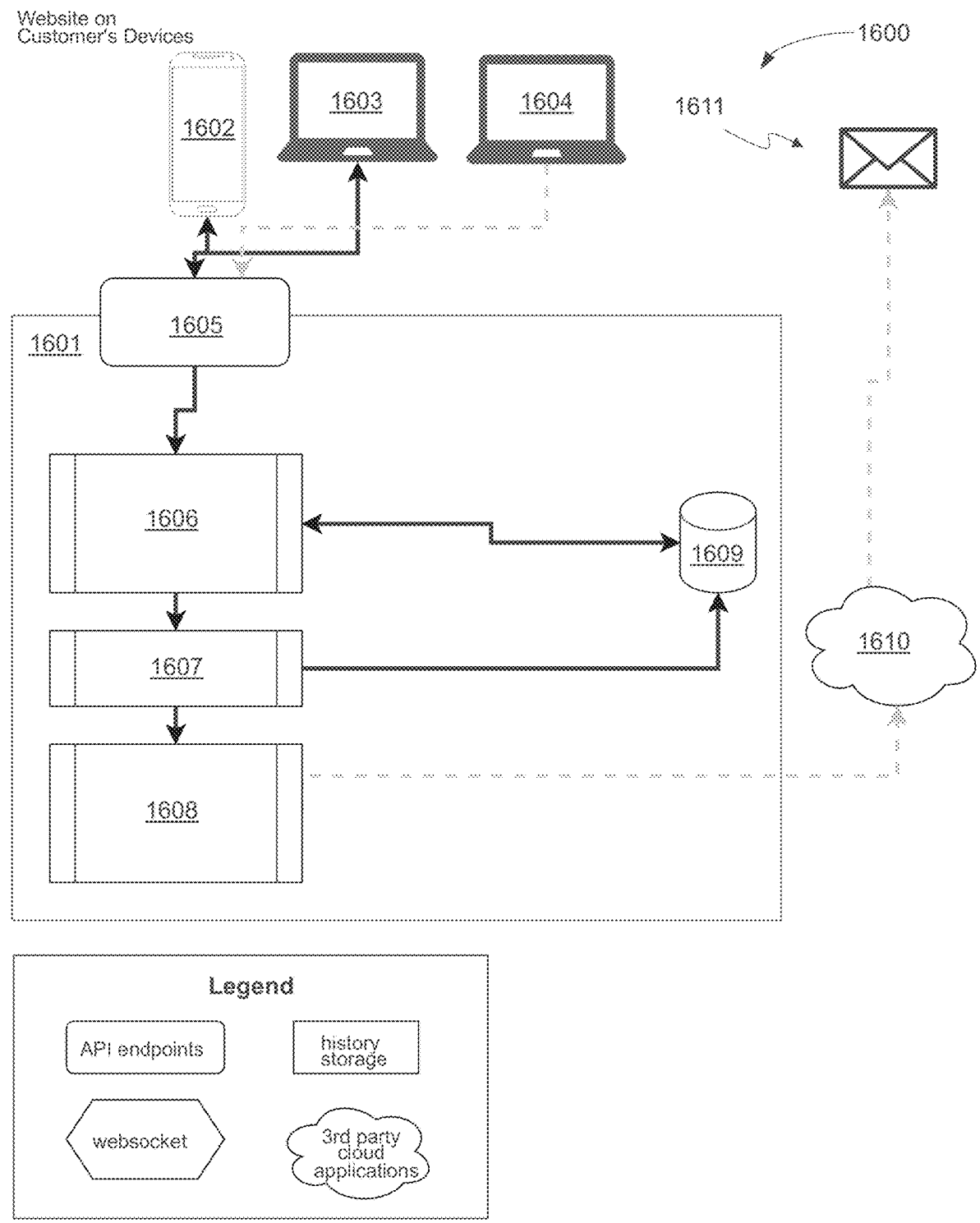
FIG. 16 illustrates a flowchart of an outgoing email communication, according to an embodiment.

FIG. 16 illustrates a flowchart 1600 of an outgoing email communication, according to an embodiment. A communications relay system 1601 may provide for aggregation and relay of outbound email communications from a customer's (e.g., a user's or landlord's) device 1602/1603/1604 to a contact's (e.g., a third party's or tenant's or prospective tenant's) email service 1611.

At 1605, the customer may send an email (e.g., a reply) from a unified inbox on a customer device 1602/1603 or an email client on a customer device 1604. At 1606, the conversation to which the email relates may be looked up in a database 1609 based on the email address to which the email is directed, and the recipient's email address may be looked in the database 1609. At 1607, the email may be saved to the database 1609. The email may be sent with the "reply-to" address set to the conversation's unique email address at 1608 via a third party email provider 1610 to a contact's email service 1611.

In one aspect, a system may enable relaying a communication. The system may include one or more hardware processors configured by machine-readable instructions. The processor(s) may receive, an inbound communication from a third party device. The processor(s) may determine, using the processing device, a sender identity associated with the inbound communication. The processor(s) may create, using the processing device, an inbound communication digest of the inbound communication. The processor(s) may store, the sender identity and the inbound communication digest on an electronic data storage unit. The processor(s) may recast the inbound communication to a relayed inbound communication including the inbound communication and the sender identity. The processor(s) may send the relayed inbound communication to the user device.

In various embodiments, the processor(s) or processing device(s) may be a part of a communications server including a networking device configured to enable electronic communication by the processing device with a user device and a third party device via a communications service. The inbound communication digest may include the sender identity and an inbound communication content.

Another aspect of the present disclosure may include a method for relaying a communication. The method may include receiving, at a processing device, an inbound communication from a third party device. The method may include determining, using the processing device, a sender identity associated with the inbound communication. The method may include creating, using the processing device, an inbound communication digest of the inbound communication. The method may include storing, using the processing device, the sender identity and the inbound communication digest on an electronic data storage unit. The method may include recasting, using the processing device, the inbound communication to a relayed inbound communication including the inbound communication and the sender identity. The method may include sending, using the processing device, the relayed inbound communication to the user device.

Yet another aspect of the present disclosure relates to a non-transient computer-readable storage medium having instructions embodied thereon, the instructions being executable by one or more processors to perform a method for relaying a communication. The method may include receiving, at a processing device of a communications server including a networking device configured to enable electronic communication by the processing device with a user device and a third party device via a communications service, an inbound communication from the third party device. The method may include determining, using the processing device, a sender identity associated with the inbound communication. The method may include creating, using the processing device, an inbound communication digest of the inbound communication. The inbound communication digest may include the sender identity and an inbound communication content. The method may include storing, using the processing device, the sender identity and the inbound communication digest on an electronic data storage unit. The method may include recasting, using the processing device, the inbound communication to a relayed inbound communication including the inbound communication and the sender identity. The method may include sending, using the processing device, the relayed inbound communication to the user device.

In some embodiments, the relayed inbound communication may include the inbound communication digest. In some embodiments, the communications service may be a telephony service, a short message system, a multimedia messaging service, or an email service. In some embodiments, the inbound communication may be a telephone call, a short message system message, a multimedia messaging service message, or an email. In some embodiments, the inbound communication may be a telephone call and wherein the determining the sender identity associated with the inbound communication includes looking up, using the processing device, the sender identity associated with a telephone number associated with the telephone call stored on the electronic data storage unit.

In some embodiments, the inbound communication may be a telephone call. In some embodiments, the recasting the inbound communication to the relayed inbound communication may include creating an instruction to place a relayed telephone call to the user device. In some embodiments, the sending the relayed inbound communication the user device may include executing the instruction on the processing device. In some embodiments, the relayed telephone call may include establishing a bridged voice connection between the third party device and the user device via the processing device.

In some embodiments, the inbound communication may be a short message system message and wherein the determining the sender identity associated with the inbound communication includes looking up, using the processing device, the sender identity associated with a telephone number associated with the short message system message stored on the electronic data storage unit.

The operations of the various methods presented herein are intended to be illustrative. In some embodiments, any of the various methods may be accomplished with one or more additional operations not described, and/or without one or more of the operations discussed. Additionally, the orders in which the operations of the various methods described herein are not intended to be limiting.

In some embodiments, any of the various methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the various methods in response to instructions stored electronically on an electronic storage medium. The one or more processing devices may include one or more devices including hardware, firmware, and/or software to be specifically designed for execution of one or more of the operations of any of the various methods.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A method, comprising:
   receiving, at a processing device of, an inbound communication from a third party device;
   determining, using the processing device, a sender identity associated with the inbound communication;
   creating, using the processing device, an inbound communication digest of the inbound communication, the inbound communication digest including the sender identity and an inbound communication content;
   storing, using the processing device, the sender identity and the inbound communication digest on an electronic data storage unit;
   recasting, using the processing device, the inbound communication to a relayed inbound communication including the inbound communication and the sender identity;
   sending, using the processing device, the relayed inbound communication to a user device;
   receiving, at the processing device, a relayed outbound communication from the user device;
   determining, at the processing device, a recipient identity associated with the relayed outbound communication;
   creating, using the processing device, an outbound communication digest of the relayed outbound communication;
   storing, using the processing device, the outbound communication digest on the electronic data storage unit;
   recasting, using the processing device, the relayed outbound communication to an outbound communication; and
   sending, using the processing device, the outbound communication to the third party device; and
   wherein the processing device composes a communications server including a networking device configured to enable electronic communication by the processing device with the user device and the third party device via a communications service.

2. The method of claim 1, wherein the relayed inbound communication includes the inbound communication digest, wherein the inbound communication digest comprises a message and a message send time.

3. The method of claim 2, wherein the inbound communication digest includes a property identifier.

4. The method of claim 1, wherein:
   the communications service is a telephony service, a short message system, a multimedia messaging service, or an email service; or
   the inbound communication is a telephone call, a short message system message, a multimedia messaging service message, or an email.

5. The method of claim 1, wherein:
   the inbound communication is a telephone call; and
   determining the sender identity associated with the inbound communication comprises identifying, using the processing device, the sender identity associated with a telephone number associated with the telephone call stored on the electronic data storage unit.

6. The method of claim 1, wherein:
   the inbound communication is a telephone call;
   recasting the inbound communication to the relayed inbound communication comprises creating an instruction to place a relayed telephone call to the user device;
   sending the relayed inbound communication to the user device comprises executing the instruction on the processing device; and
   the relayed telephone call comprises establishing a bridged voice connection between the third party device and the user device via the processing device.

7. The method of claim 1, wherein:
   the inbound communication is a short message system message; and:
      determining the sender identity associated with the inbound communication comprises identifying, using the processing device, the sender identity associated with a telephone number associated with the short message system message stored on the electronic data storage unit; or
      recasting the inbound communication to the relayed inbound communication comprises creating an instruction to send a text content of the short message system message to the user device, and
      sending the relayed inbound communication to the user device comprises executing the instruction on the processing device.

8. The method of claim 1, wherein:
   the inbound communication is an email; and:
      determining the sender identity associated with the inbound communication comprises identifying, using the processing device, the sender identity associated with an email address associated with the email stored on the electronic data storage unit; or
      recasting the inbound communication to the relayed inbound communication comprises creating an instruction to send a text content of the email to the user device, and
      sending the relayed inbound communication to the user device comprises executing the instruction.

9. The method of claim 1, wherein the outbound communication includes the outbound communication digest, wherein the outbound communication digest comprises a message and a message send time.

10. The method of claim 1, wherein the relayed outbound communication is a telephone call, a short message system message, a multimedia messaging service message, or an email.

11. The method of claim 1, wherein the recasting the relayed outbound communication to an outbound communication comprises:
- performing, using the processing device, a lookup of the recipient identity associated with the third party device stored on the electronic data storage unit; and
- creating an instruction to send a relayed outbound communication content to the third party device.

12. The method of claim 1, wherein:
the relayed outbound communication is a short message system message; and:
- determining the sender identity associated with the relayed outbound communication comprises identifying, using the processing device, the sender identity associated with a telephone number associated with the short message system message stored on the electronic data storage unit; or
- recasting the relayed outbound communication to the outbound communication comprises creating an instruction to send a text content of the short message system message to the user device, and
- sending the outbound communication to the user device comprises executing the instruction on the processing device.

13. The method of claim 1, wherein:
the relayed outbound communication is an email; and:
- determining the sender identity associated with the relayed outbound communication comprises identifying, using the processing device, the sender identity associated with an email address associated with the email stored on the electronic data storage unit; or
- recasting the relayed outbound communication to the outbound communication comprises creating an instruction to send a text content of the email to the user device, and
- sending the outbound communication to the user device comprises executing the instruction.

14. A system, comprising:
- a processing device configured to execute machine-readable instructions;
- an electronic data storage unit in communication with the processing device;
- a networking device in communication with the processing device, the networking device configured to enable electronic communication by the processing device with a user device and a third party device via a communications service;
- wherein the processing device is configured to execute machine-readable instructions to:
  - receive an inbound communication from the third party device via the communications service;
  - determine a sender identity associated with the inbound communication;
  - create an inbound communication digest of the inbound communication, the inbound communication digest including the sender identity and an inbound communication content;
  - store the sender identity and the inbound communication digest on the electronic data storage unit;
  - recast the inbound communication to a relayed inbound communication including the inbound communication and the sender identity; and
  - send the relayed inbound communication to the user device.

15. The system of claim 14, wherein:
the third party device is a landline telephone, a cellular telephone, a smartphone, a desktop computer, or a laptop computer;
the communications service is a telephony service, a short message system, a multimedia messaging service, or an email service; or
the inbound communication is a telephone call, a short message system message, a multimedia messaging service message, or an email.

16. The system of claim 14, wherein:
the third party device is a first landline telephone, a first cellular telephone, a first smartphone, a first desktop computer, or a first laptop computer; or
the user device is a second landline telephone, a second cellular telephone, a second smartphone, a second desktop computer, or a second laptop computer.

17. The system of claim 14, wherein the processing device, the electronic data storage unit, and the networking device compose a communications server.

18. The system of claim 14, wherein the user device comprises a graphical user interface configured to display the relayed inbound communication.

19. A non-transient computer-readable storage medium having instructions embodied thereon, by one or more processing devices to perform a method comprising:
- receiving an inbound communication from a third party device;
- determining a sender identity associated with the inbound communication;
- creating an inbound communication digest of the inbound communication;
- storing the sender identity and the inbound communication digest on an electronic data storage unit;
- recasting the inbound communication to a relayed inbound communication; and
- sending the relayed inbound communication to a user device.

20. The non-transient computer-readable storage medium of claim 19, wherein the method further comprises:
- receiving a relayed outbound communication from the user device;
- determining a recipient identity associated with the relayed outbound communication;
- creating an outbound communication digest of the relayed outbound communication;
- storing the outbound communication digest on the electronic data storage unit;
- recasting the relayed outbound communication to an outbound communication; and
- sending the outbound communication to the third party device.

* * * * *